US008345826B2

(12) United States Patent
Eslambolchi et al.

(10) Patent No.: US 8,345,826 B2
(45) Date of Patent: *Jan. 1, 2013

(54) SYSTEMS AND METHODS FOR MONITORING VOICE SERVICE FEATURE FAILURES IN A TELECOMMUNICATION NETWORK

(75) Inventors: Hossein Eslambolchi, Los Altos, CA (US); John McCanuel, Bailey, CO (US); Paritosh Bajpay, Edison, NJ (US); Arun Kandappan, Morganville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 460 days.

This patent is subject to a terminal disclaimer.

(21) Appl. No.: 12/628,081

(22) Filed: Nov. 30, 2009

(65) Prior Publication Data

US 2010/0074417 A1  Mar. 25, 2010

Related U.S. Application Data

(63) Continuation of application No. 11/321,088, filed on Dec. 30, 2005, now Pat. No. 7,627,093.

(51) Int. Cl.
*H04M 11/00* (2006.01)

(52) U.S. Cl. .................... 379/47; 379/45; 379/40.01

(58) Field of Classification Search ............ 379/37–47, 379/1, 9.03, 14.01, 32.01; 709/224; 714/47, 714/48; 370/352, 353
See application file for complete search history.

(56) References Cited

U.S. PATENT DOCUMENTS

| 5,799,317 | A | 8/1998 | He et al. |
| 5,852,649 | A | 12/1998 | Hodson |
| 5,999,604 | A | 12/1999 | Walter |
| 6,445,774 | B1* | 9/2002 | Kidder et al. ............... 379/9.03 |
| 6,732,167 | B1 | 5/2004 | Swartz et al. |
| 7,010,593 | B2* | 3/2006 | Raymond ..................... 709/224 |
| 7,274,932 | B1* | 9/2007 | Iyer ............................. 455/423 |
| 7,627,093 | B1 | 12/2009 | Eslambolchi et al. |
| 2003/0023714 | A1* | 1/2003 | Ziegler et al. ................ 709/224 |
| 2005/0069097 | A1* | 3/2005 | Hanson et al. ............ 379/88.12 |
| 2005/0069104 | A1 | 3/2005 | Hanson et al. |
| 2005/0074109 | A1 | 4/2005 | Hanson et al. |
| 2005/0074111 | A1 | 4/2005 | Hanson et al. |

OTHER PUBLICATIONS

AT&T Labs Research News—Forum Puts Focus on Labs Innovation, http://www.research.att.com/news/2002/December/InnovationForum.html.
Sonus Networks, Inc.—GSX9000, http://www.sonuset.com/contents/products/gsx.cfm.
Quality of Service: Guaranteeing VoIP QoS, Original article published Jul. 29, 2005, www.fiercevoip.com.

* cited by examiner

*Primary Examiner* — Melur Ramakrishnaiah

(57) ABSTRACT

A method includes receiving multiple alarm messages, each being associated with a failure associated with a service feature available within a telecommunication network. A failure rate for a type of failure having a common set of service feature failure characteristics is determined from the alarm messages received. When the failure rate exceeds a threshold, a maintenance ticket is generated automatically.

20 Claims, 4 Drawing Sheets

SYSTEMS AND METHODS FOR MONITORING VOICE SERVICE FEATURE FAILURES IN A TELECOMMUNICATION NETWORK

This application is a continuation of U.S. patent application Ser. No. 11/321,088, filed Dec. 30, 2005 now U.S. Pat. No. 7,627,093, and herein incorporated by reference in its entirety.

BACKGROUND

The invention relates generally to telecommunication networks and methods, and more particularly to systems and methods for monitoring voice service feature failures and generating maintenance tickets in response to such failures.

Voice over Internet Protocol ("VoIP") is a method for transmitting voice telephone calls using a computer network based on the internet protocol ("IP"). VoIP telephony offers many advantages over placing calls using the Public Switched Telephone Network ("PSTN"), such as allowing users to employ a single network to carry both data traffic and voice traffic. VoIP telephony also allows service providers to offer advanced service features not available with PSTN calling plans. One such service features is, for example, a "locate me" feature, which is an advanced type of call forwarding that allows a user to select multiple alternate end devices to which an incoming call is automatically transferred when the user is not available at their assigned end device. Another such service feature is, for example, a "do not disturb" feature, which is an advanced form of call screening that notifies the calling party that the user does not wish to be disturbed unless the incoming call is an emergency.

To facilitate the management of VoIP networks, some service providers collect information for each VoIP call attempted or successfully placed. Such information can include the duration of the call, the identity of the calling party, the identity of the called party, and the reason for the termination of the call. The compilation of such information is commonly known as a call-detail record ("CDR"). Known network management systems and methods employ the information included in CDR's for many different purposes, including network maintenance. For example, when a user reports call failures on a VoIP network, a service provider can use the information included in the CDR's to isolate a possible cause and location of the failure.

The information included in the CDR's, however, is often insufficient to identify a failure associated with a service feature. Furthermore, because a service feature failure does not necessarily result in a failed call, users are often unaware that such a failure has occurred. For example, a user having a "locate me" feature may designate five different end devices to receive incoming calls in a serial fashion. A failure associated with this feature may result in the incoming calls being routed to the alternate end devices in a parallel fashion. In such a case, the information included within a CDR is insufficient to identify this service feature failure. Furthermore, in many cases the user will be unaware that a service feature failure has occurred.

Thus, a need exists for a system monitoring voice service feature failures and generating automatically maintenance tickets in response to such failures, the maintenance tickets being generated in a manner that prevents excessive and duplicative maintenance tickets from being issued.

SUMMARY

A method includes receiving multiple alarm messages, each being associated with a failure associated with a service feature available within a telecommunication network. A failure rate for a type of failure having a common set of service feature failure characteristics is determined from the alarm messages received. When the failure rate exceeds a threshold, a maintenance ticket is generated automatically.

DETAILED DESCRIPTION

A method includes receiving multiple alarm messages, each being associated with a failure associated with a service feature available within a telecommunication network. A failure rate for a type of failure having a common set of service feature failure characteristics is determined from the alarm messages received. The set of service feature failure characteristics can include, for example, a type of service feature affected, a failure mechanism, an identification associated with a server from which an alarm message was received, a geographical area affected, and/or a list of end users affected. When the failure rate exceeds a threshold, a maintenance ticket is generated automatically.

In some embodiments, the failure rate is determined based on a number of service feature failures associated with the set of service feature characteristics over a predetermined time period, a percentage of service feature failures associated with the set of service feature characteristics over a predetermined time period, and/or a rate of change of service feature failures associated with the set of service feature characteristics over a predetermined time period. In this manner, the failure rate can be determined in a manner specific to each set of service feature characteristics.

In some embodiments, a method includes receiving a multiple alarm messages, each being associated with a failure associated with a service feature available within a telecommunication network. A first failure rate for a type of failure having a common set of service feature failure characteristics is determined from the alarm messages received, the first failure rate being determined over a first predetermined time period. When the first failure rate exceeds a threshold, a maintenance ticket is generated automatically. A second failure rate for the type of failure having the common set of service feature failure characteristics is determined from the alarm messages received, the second failure rate being determined over a second predetermined time period that ends after the first predetermined time period ends.

When the second failure rate crosses a second threshold, the maintenance ticket is modified automatically.

Figure 1:
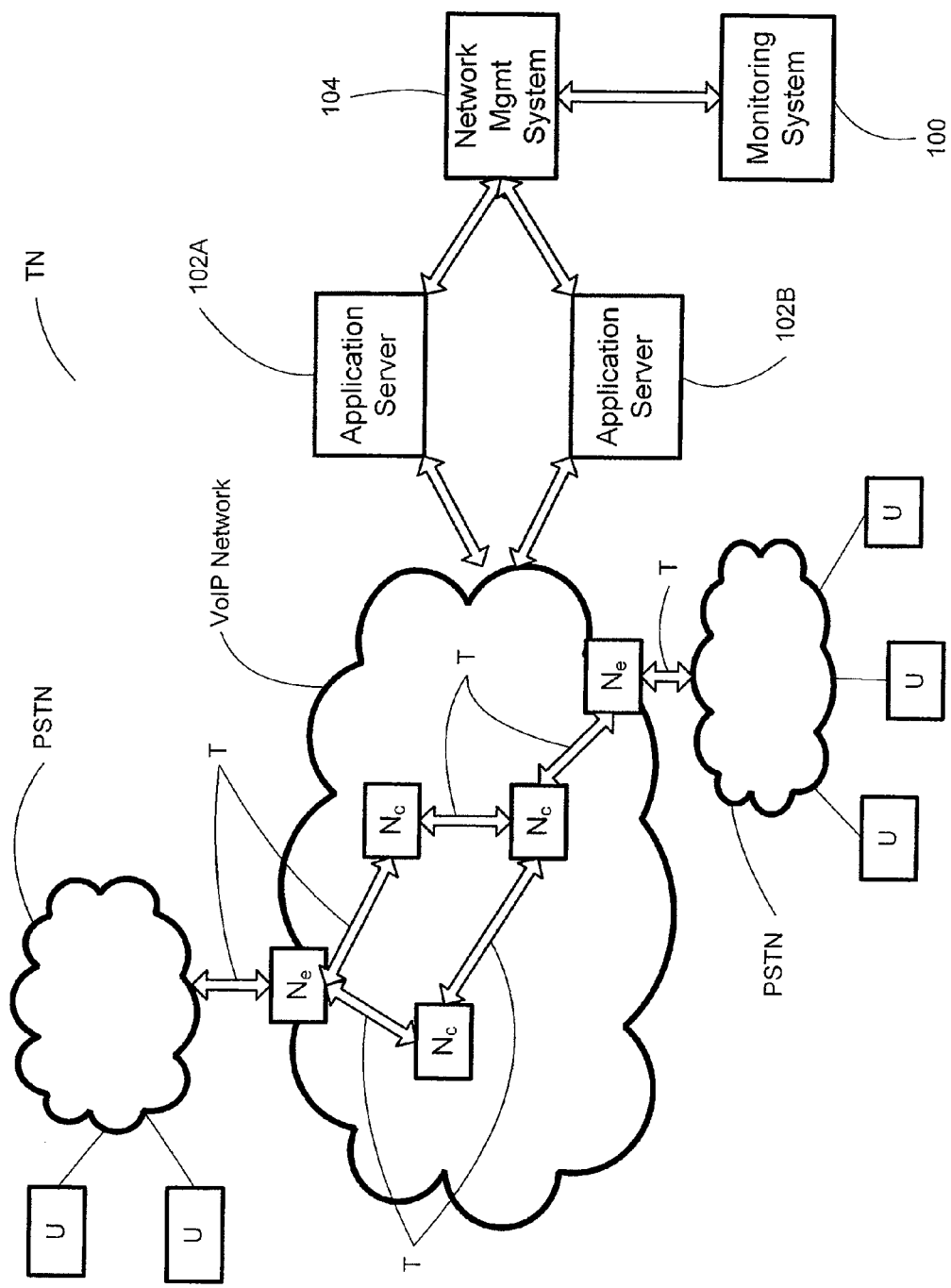
FIG. 1 is a schematic illustration of a portion of a telecommunication network that includes a system for monitoring voice service feature failures according to an embodiment of the invention.

FIG. 1 is a schematic illustration of a portion of a telecommunication network TN for transmitting VoIP telephony calls. The telecommunication network TN includes a VoIP network, which includes a series of interconnected edge nodes $N_e$ and core nodes $N_c$. The edge nodes $N_e$ can be, for example, gateway devices that provide a point of connection from a public switched telephone network PSTN to the VoIP network. One example of such a gateway device is the SONUS GSX9000™ Open Services Switch. The core nodes $N_c$ can be, for example, routers that reside wholly within the VoIP network that interconnect the edge nodes $N_e$ by a series of transmission lines T, which can be, for example, high-bandwidth T3 trunk lines.

The illustrated telecommunication network TN includes a series of user end devices U that are connected to the VoIP network via a public switched telephone network PSTN. Each public switched telephone network PSTN is connected to an edge node $N_e$ by a transmission line T, which can be, for example, a high-bandwidth T3 trunk line.

The illustrated telecommunication network TN also includes two application servers 102A and 102B, a network management system 104 and a monitoring system 100 according to an embodiment of the invention. The application servers 102A and 102B are processor-based systems, such as the Sun Fire 280R Server, that contain the code necessary to implement various service features available within the VoIP network. Such service features can include, for example, a "locate me" feature, a "do not disturb" feature, a conference call feature, and/or a safe call forward feature. A "locate me" feature is an advanced type of call forwarding that allows a user to identify multiple alternate end devices to which an incoming call is automatically transferred when the user is not available at their assigned end device. The "locate me" feature allows the user to select whether the alternate end devices are to be contacted in a parallel or serial fashion, and allows a person answering one of the alternate end devices to either accept or reject the incoming call. A "do not disturb" feature is an advanced type of call screening that notifies the calling party that the user does not wish to be disturbed. This feature gives the calling party an option of either transmitting the call (i.e., in the case of an emergency), leaving a message, or simply hanging up. A conference call feature ties together multiple users and allows them to simultaneously speak and be heard. Finally, a safe call forward feature allows a user to designate an alternate end device to which incoming calls are transferred in the event that a power outage prevents the assigned end device from receiving incoming calls. The above service features are discussed listed as examples only. In some embodiments, the application servers 104 can contain code necessary to implement many other types of service features, such as call waiting and caller ID.

In some instances, one application server 102 is dedicated to implementing a single service feature or subset of service features available within the telecommunication network TN. In other instances, multiple interconnected application servers 102 are required to implement a single service feature. For example, one application server 102 may implement a service feature within a first geographic portion of the telecommunication network TN while a second application server 102 may implement the same service feature within a second geographic portion of the telecommunication network TN.

Similarly, although the application servers 102A and 102B are described as containing code for implementing service features, in some instances the telecommunication network TN can include additional application servers 102 configured to support other aspects of network management, such as billing and/or network maintenance.

The application servers 102A and 102B implement the desired service features by communicating with a user's end device U and responding based on the status of the end device U and the service features selected. In some embodiments, the application servers 102A and 102B communicate with a user's end device U via a terminal adapter (not shown in FIG. 1). For example, an end device U can notify an application server 102 when it is busy or when the user has enabled a particular feature, such as the "do not disturb" feature. An application server 102 then implements the service feature by ensuring that incoming calls are routed according to a dialing plan that is consistent with the status of the end device U and the service features selected by the user.

As will be described in more detail below, the application servers 102A and 102B are also configured to output an alarm message when a failure associated with a service feature has occurred. In the illustrated embodiment, a network management system 104 is configured to receive and process such incoming alarm messages. Processed alarm messages are then transmitted to a monitoring system 100 that generates maintenance tickets based on the information contained therein.

Figure 2:
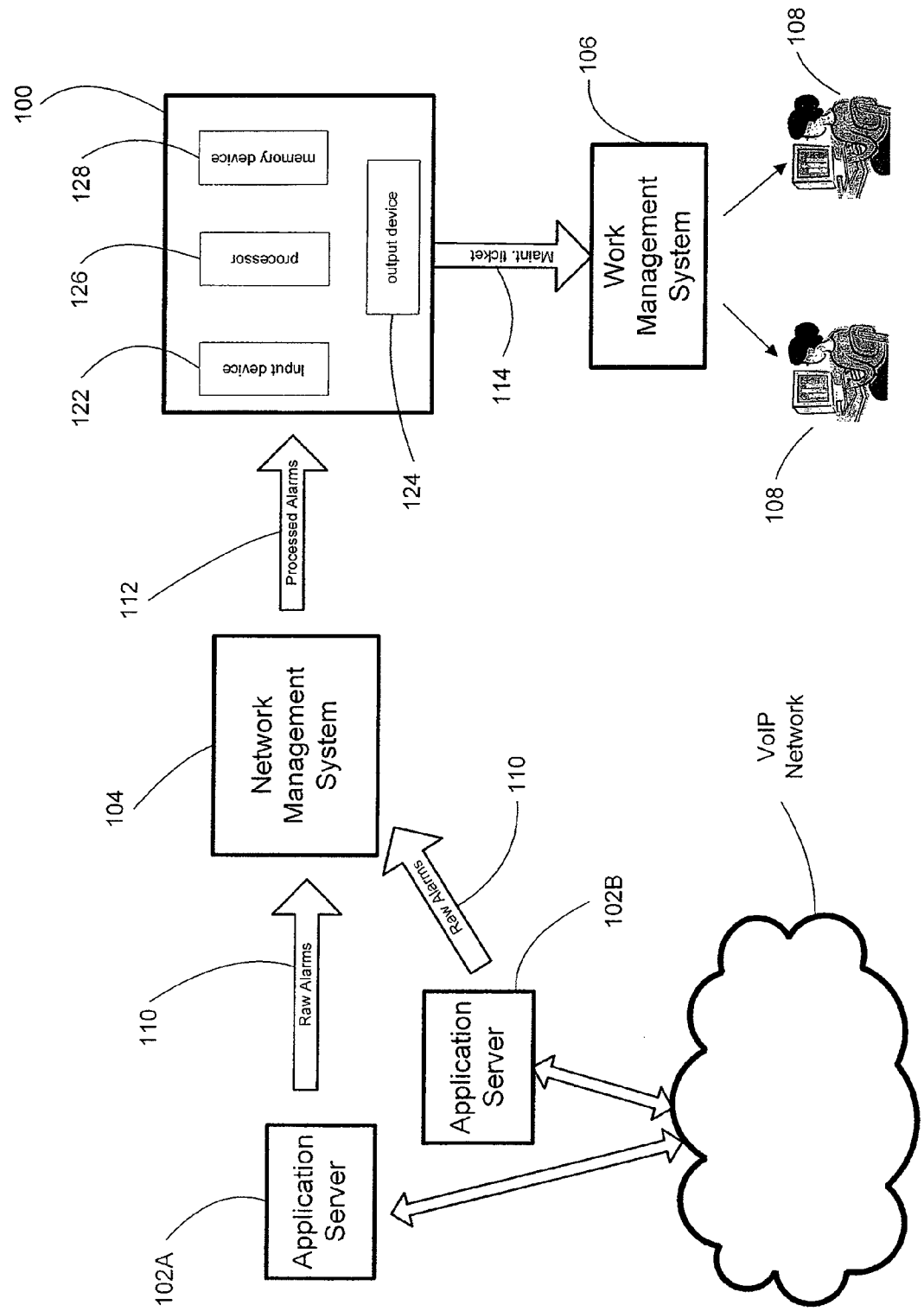
FIG. 2 is a schematic illustration of a system for monitoring voice service feature failures and generating maintenance tickets in response to such failures according to an embodiment of the invention.

FIG. 2 is a schematic illustration of a monitoring system 100 for monitoring voice service feature failures and generating maintenance tickets 114 in response to such failures according to an embodiment of the invention. The monitoring system 100 includes a processor 126 and a memory device 128. The illustrated monitoring system 100 also includes an input device 122 configured to receive input from an external source, such as a network management system 104, as described below. Similarly, the monitoring system 100 includes an output device 124 configured to provide output to an external device, such as a work management system 106, as described below.

The monitoring system 100 is configured to receive processed alarm messages 112 from a network management system 104. As illustrated, the network management system 104 is a centralized system that receives and compiles raw alarm messages 110 associated with a failure of a service feature produced by application servers 102A and 102E. The network management system 104 can be, for example, a centralized database system configured to receive and compile alarm messages and error messages from a variety of sources. As discussed above, the application servers 102 are processor-based systems in communication with a VoIP network that serve to implement various service features.

Upon receiving a raw alarm message 110, the network management system 104 processes the information contained therein to generate a processed alarm message 112 that contains a standard set of information in a standard format. Such processing is required in some embodiments because the incoming raw alarm messages 110 can contain a variety of different information and can be in a variety of different formats depending on the type and/or manufacturer of the application server 102 that is generating the raw alarm message 110. Such information can include, for example, a summary of events associated with a failure of a service feature, such as the type of service feature, a failure mechanism identified by the application server 102, an identification of the application server 102 that produced the raw alarm message 110, a geographical area affected by the failure, and/or a list of end users affected by the failure. Similarly, such different formats can include, for example, binary, hexadecimal, and/or any other machine-readable format. In some embodiments, for example, the processing done by the network management system 104 can include translating a hexadecimal representation of a failure code into a literal English description of the event that caused the service feature to fail.

Upon receiving the processed alarm messages 112, the monitoring system 100 analyzes the information contained therein according to one or more parameters that characterize a type of failure associated with a service feature. In some embodiments, the monitoring system 100 analyzes the processed alarms 112 based on the application server 102 that produced the raw alarm messages 110 and the type of service feature affected by the failure. Other examples of parameters that can be used to characterize a service feature failure include a failure mechanism identified as causing the failure, a geographical area affected by the failure, and/or a list of end users affected by the failure. By analyzing the processed alarm messages 112 in this manner, the monitoring system 100 can respond in a manner that is unique to a particular type of failure. For example, if an application server 102 is known to have a propensity to fail in a particular manner, the monitoring system 100 can be configured generate a maintenance ticket 114 when a relatively low number of failures of that type have been identified. Conversely, if it is known that a certain type of service feature will be off-line for routine maintenance for a predetermined time period, the monitoring system 100 can be configured to respond by monitoring for the failures affecting that service feature over a longer period of time, thereby acting as a filter to prevent a maintenance ticket 114 from being issued prematurely.

Once the information contained within the processed alarm messages 112 is sorted by a particular set of service feature failure characteristics that characterize a type of failure, the monitoring system 100 determines a failure rate associated with the failure type. The failure rates can be determined in a number of different ways. In some embodiments, for example, the failure rates are determined based on a number of service feature failures over a predetermined time period, a percentage of service feature failures over a predetermined time period, and/or a rate of change of service feature failures over a predetermined time period.

The monitoring system 100 then determines whether a failure rate associated with the particular set of service feature failure characteristics exceeds a predefined threshold. When a failure rate exceeds a threshold, the monitoring system 100 can react in a number of different ways. For example, in some embodiments, when a threshold is exceeded, the monitoring system 100 automatically generates a maintenance ticket 114 to trigger the appropriate service personnel 108 to take action to take corrective action. In other embodiments, when a threshold is exceeded, the monitoring system 100 automatically updates an existing maintenance ticket 114 with additional information pertaining to the service feature failure. In this manner, the monitoring system 100 can avoid prematurely generating maintenance tickets 114 and/or generating duplicative maintenance tickets 114, both of which cause inefficiencies in the management of the network.

In the illustrated embodiment, once a maintenance ticket 114 is generated, it is then transmitted to a work management system 106 where it is disseminated to the appropriate service personnel 108. In some embodiments, the maintenance ticket 114 is selectively transmitted to only a targeted group of service personnel 108, such as those service personnel 108 responsible for the portion of the VoIP network that is experiencing the service feature failure. In this manner, the monitoring system 100 limits the mass distribution of maintenance tickets 114. In yet other embodiments, the maintenance ticket 114 is selectively transmitted directly to the appropriate service personnel 108. For example, the maintenance ticket 114 can be in the form of an e-mail sent directly to the appropriate service personnel 108. The methods employed by the monitoring system 100 for generating and transmitting maintenance tickets in response to service feature failures are discussed in more detail below.

The illustrated monitoring system 100 includes a processor 126 and a memory device 128. The processor 126 can be a commercially-available processing device configured to perform one or more specific tasks. For example, the processor 126 can be a commercially-available microprocessor. Alternatively, the processor 126 can be an application-specific integrated circuit (ASIC) or a combination of ASICs, which are designed to perform one or more specific functions. In yet other embodiments, the processor 126 can be an analog or digital circuit, or a combination of multiple circuits.

The memory device 128 can include one or more types of memory. For example, the memory device 128 can include a read only memory (ROM) component and a random access memory (RAM) component. The memory device 128 can also include other types of memory suitable for storing data in a form retrievable by the processor 126, for example, electronically programmable read only memory (EPROM), erasable electronically programmable read only memory (EEPROM), or flash memory.

Although the monitoring system 100 is illustrated and described as including a processor 126, a memory device 128, an input device 122 and an output device 124, in some embodiments, the system can include software in the form of processor-readable code instructing a processor to perform the functions described herein. In other embodiments, the monitoring system 100 can include firmware that performs the functions described herein.

The operations performed by the monitoring system 100 can be done either automatically or manually. An operation is done automatically when it is done without human intervention. For example, in some embodiments, the monitoring system 100 determines automatically the failure rate for a type of failure having a common set of service feature failure characteristics. In other embodiments, however, the monitoring system 100 may require input from a user, such as selecting a method of calculating a failure rate, before determining such a failure rate.

Although the monitoring system 100, the network management system 104 and the application servers 102A and 102B are shown and described above as being separate systems, in some embodiments, the functions of the monitoring system 100 can be incorporated into the network management system 104. In other embodiments, the functions of the monitoring system 100 can be incorporated into one or more application servers 102. In yet other embodiments, certain functions of the monitoring system 100 can be incorporated into the network management system 104, while certain other functions of the monitoring system 100 can be incorporated into one or more application servers 102.

Figure 3:
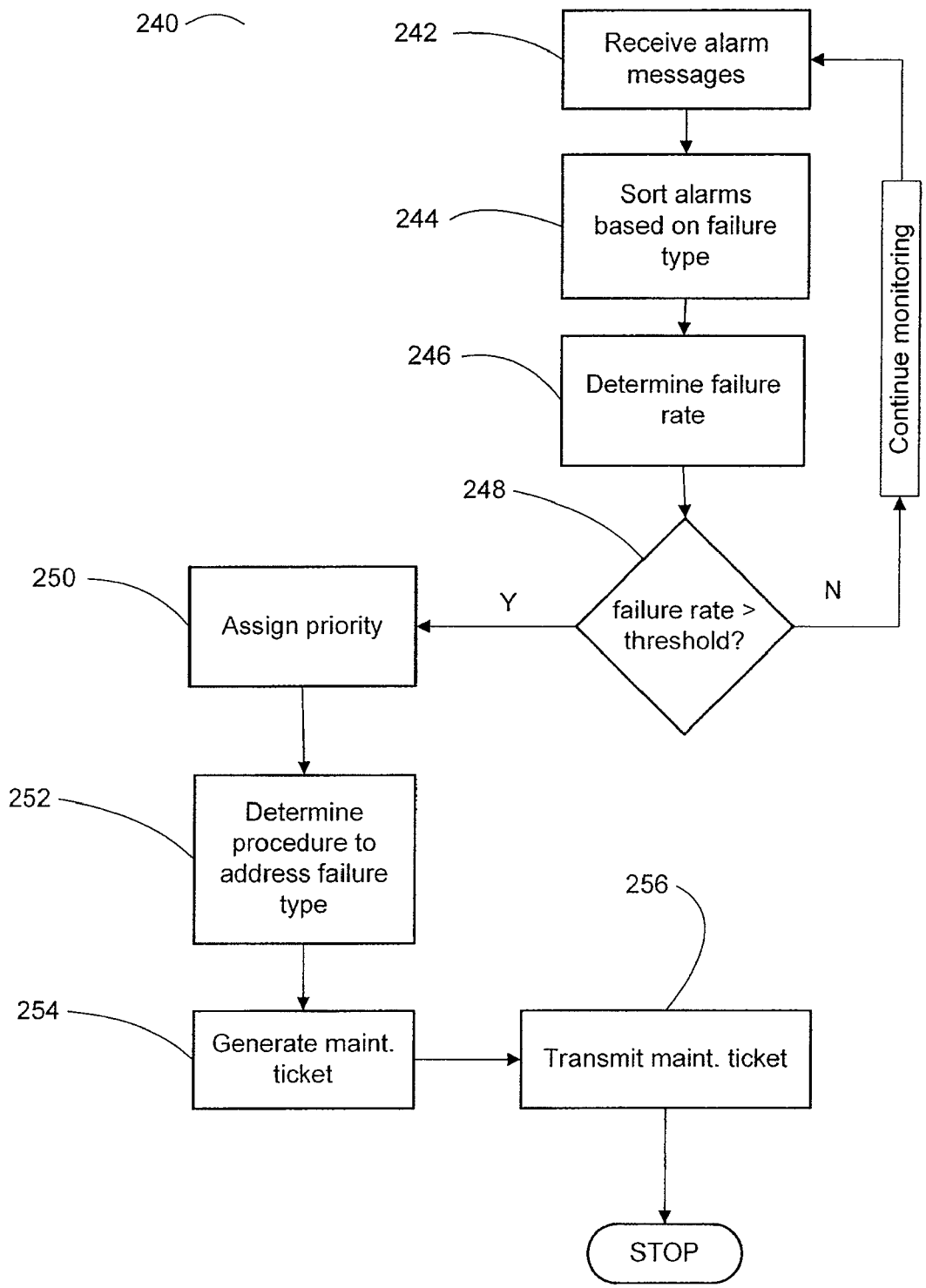
FIGS. 3 and 4 are flow charts illustrating methods of monitoring voice service feature failures and generating maintenance tickets in response to such failures according to various embodiments of the invention.

FIG. 3 is a flow chart illustrating a method 240 of monitoring voice service feature failures according to various embodiments of the invention. The illustrated method includes receiving multiple alarm messages, each of the alarm messages being associated with a service feature failure, 242. As described above, the alarm messages received can be processed alarm messages received from a network management system. Alternatively, the alarms received can be raw alarm messages generated by multiple application servers configured to implement various service features available within a VoIP network.

Upon receiving the alarm messages, the illustrated method includes sorting the alarm messages according to one or more parameters that characterize a service feature failure type, 244. As described above, such parameters can an identity of the application server that produced the raw alarm message, the type of service feature affected by the failure, a failure mechanism identified as causing the failure, a geographical area affected by the failure, and/or a list of end users affected by the failure. In some embodiments, this operation also includes generating one or more lists of service feature failure types. In other embodiments, this sorting does not result in such a list.

The illustrated method then includes determining a failure rate for a failure type having a common set of service feature failure characteristics, 246, and determining whether the failure rate exceeds a predefined threshold, 248. The failure rate can be determined based on a number of service feature failures over a predetermined time period, a percentage of service feature failures over a predetermined time period, and/or a rate of change of service feature failures over a predetermined time period. The failure rate can be determined using, for example, a first-in, first-out ("FIFO") buffering scheme or a batch process. When a FIFO buffering scheme is used, the monitoring system continually determines the failure rate over a rolling time period of a predetermined duration. Conversely, when a batch process is used, the monitoring system determines the failure rate at the end of each discrete block of time.

By grouping the alarm messages according to a set of service feature failure characteristics, the illustrated method allows the determination of the failure rate, the threshold settings and/or time periods to be customized for each set of service feature failure characteristics. For example, in some embodiments, the failure rate associated with a first grouping of service feature failure failures is determined as a number of service feature failure failures over a predetermined time period, while the failure rate associated with a second grouping of service feature failure failures is determined as a percentage of service feature failure failures over a predetermined time period. In other embodiments, the predetermined time periods used in determining the failure rate can be set to different values associated with a set of service feature failure characteristics. Similarly, the predefined thresholds can be unique to a given set of service feature failure characteristics.

In the illustrated embodiment, when the failure rate does not exceed the predefined threshold, the method includes looping back to operation 242 to monitor continually the incoming information. As discussed above, the information can be monitored using either a first-in, first-out ("FIFO") buffering scheme or using a batch process.

When the first failure exceeds the first predefined threshold, however, the illustrated method includes assigning a priority level associated with the failure type, 250. In some embodiments the operation of assigning a priority is done automatically using a rules-based algorithm. For example, a priority level can be assigned based on how many of a specific number of predetermined criteria are met. Such criteria can be tailored to take into account such factors as the amount by which the failure rate exceeded the threshold, the number of customers affected by the failure type, and/or the type of service feature.

The illustrated method also includes determining a procedure for addressing the failure type, 252. In some embodiments, the operation of determining a procedure for addressing the failure type is done automatically using a rules-based algorithm. For example, a monitoring system can include a library of procedures for addressing a variety of failure types. A procedure can be selected automatically from those procedures included in the library based on how many of a specific number of predetermined criteria are met. Such criteria can be tailored to take into account such factors as the mechanism identified as causing the service feature failure, an identification of the application server that is affected by the service feature failure, and/or the type of service feature.

The illustrated method then includes generating a maintenance ticket, 254, and transmitting the maintenance ticket to a work management system or the appropriate service personnel, as discussed above, 256. In some embodiments the maintenance ticket is configured to include a summary of information related to the type of service feature failure. Such information can include, for example, the failure rate, the application server affected, the assigned priority, and/or the procedure determined in operation 252.

Figure 4:
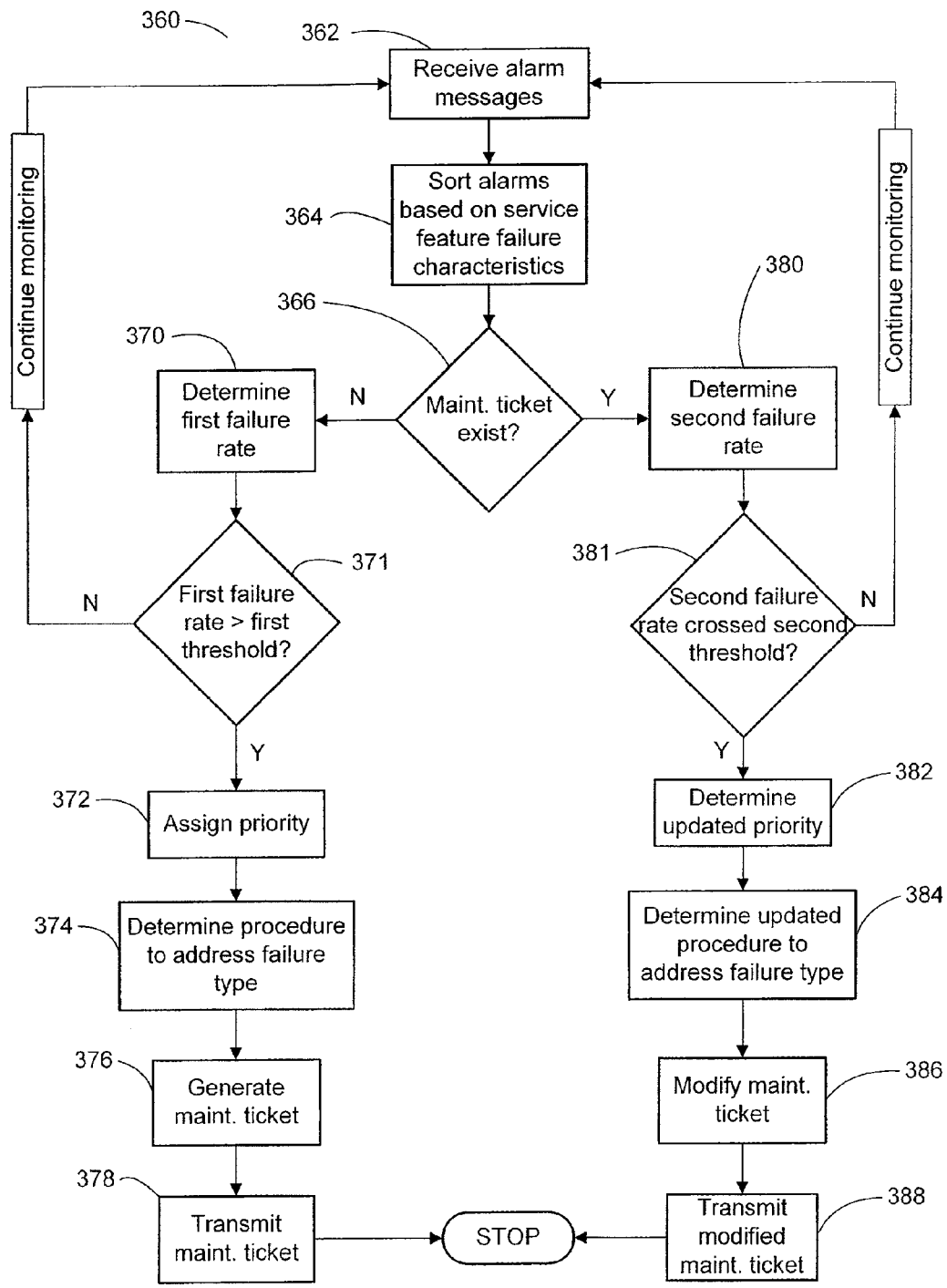

FIG. 4 is a flow chart illustrating a method 360 of monitoring voice service feature failures according to various embodiments of the invention. The illustrated method 360 includes many operations that are similar or analogous to those discussed above in reference to the method 240. For example, the illustrated method includes receiving multiple alarm messages, 362, and sorting the alarm messages according to one or more parameters that characterize a service feature failure type, 364, as discussed above.

The illustrated method then includes determining whether a maintenance ticket associated with the identified service feature failure type exists, 366. When a maintenance ticket does not exist, the illustrated method includes determining a first failure rate for the identified service feature failure type, 370, and determining whether the first failure rate exceeds a first predefined threshold, 371. When the first failure rate exceeds the first predefined threshold, similar to the operations described above, the illustrated method then includes assigning a priority, 372, determining a procedure for addressing the failure type, 374, generating a maintenance ticket, 376, and transmitting the maintenance ticket to a work management system or the appropriate service personnel, 378, as described above.

When a maintenance ticket associated with the identified service feature failure type does not exist, the illustrated method includes determining a second failure rate for the identified service feature failure type, 380. Similar to the first failure rate, the second failure can be determined based on a number of service feature failures over a predetermined time period, a percentage of service feature failures over a predetermined time period, and/or a rate of change of service feature failures over a predetermined time period. In some embodiments, the second failure rate can be determined in the same manner as the first failure rate. In other embodiments, the second failure rate and the first failure rate can be determined differently. For example, in some embodiments, the first failure rate for a set of service feature failure characteristics is determined based on the number of service feature failures over a first predetermined time period, while the second failure rate for the set of service feature failure characteristics is determined based on the percentage of service feature failures over a second predetermined time period that is different from the first predetermined time period.

The predetermined time period used in determining the second failure rate can be the same as or different from the predetermined time period used in determining the first failure rate. Furthermore, the two time periods can be either partially overlapping or completely separate. For example, in some embodiments, the starting point for the time period used in determining the second failure rate occurs before the ending point for the time period used in determining the first failure rate has occurred. In other embodiments, there is no overlap between the two time periods. For example, in such embodiments, the beginning point for the time period used in determining the second failure rate occurs after the ending point for the time period used in determining the first failure rate has occurred.

As with the first failure rate, the second failure rate can be determined using, for example, a first-in, first-out ("FIFO") buffering scheme or a batch process. When a FIFO buffering scheme is used, the monitoring system continually determines the second failure rate over a rolling time period of a predetermined duration. Conversely, when a batch process is used, the monitoring system determines the second failure rate at the end of each discrete block of time.

The illustrated method then includes determining whether the second failure rate has crossed a second predefined threshold, 381. The second threshold is crossed when the second failure rate either exceeds the second threshold or drops below the second threshold. In this manner, the illustrated method allows a maintenance ticket to be updated either when the failure rate continues to increase or when the failure rate drops below a "safe" level.

When the second threshold crosses the second predefined threshold, the illustrated method includes determining an updated a priority, 382, determining an updated procedure for addressing the failure type, 384, updating the maintenance ticket, 386, and transmitting the updated maintenance ticket to a work management system or the appropriate service personnel, 388, as described above.

CONCLUSION

While various embodiments of the invention have been described above, it should be understood that they have been presented by way of example only, and not limitation. For example, although the above methods are shown and described above as a series of operations occurring in a particular order, in some embodiments, certain operations can be completed in a parallel fashion. In other embodiments, the operations can be completed in an order that is different from that shown and described above.

For example, although the above systems and methods are shown and described as monitoring for voice service feature failures on a VoIP network, the systems and methods can be applied to monitor for voice service feature failures on a standard public switched telephone network.

What is claimed is:

1. A method, comprising:
  receiving a plurality of alarm messages, each alarm message from the plurality of alarm messages being associated with a failure from a plurality of failures, each failure from the plurality of failures being associated with a service feature available within a telecommunication network between an endpoint and a server providing the service feature;
  determining, from the plurality of alarm messages, a failure rate for a type of failure having a common set of service feature failure characteristics; and
  generating, by a processor, automatically a maintenance ticket when the failure rate exceeds a threshold.

2. The method of claim 1, wherein the telecommunication network comprises a voice over internet protocol network.

3. The method of claim 1, wherein the set of service feature failure characteristics includes a failure mechanism.

4. The method of claim 1, wherein the failure rate is a number of service feature failures associated with the set of service feature characteristics over a predetermined time period.

5. The method of claim 1, wherein the service feature includes a locate me feature.

6. The method of claim 1, further comprising automatically and selectively transmitting the maintenance ticket to a targeted recipient.

7. The method of claim 1, further comprising:
  assigning a priority setting associated with the type of failure; and
  transmitting the maintenance ticket to a work management system.

8. The method of claim 1, further comprising:
  determining automatically using a rules-based algorithm a procedure to address the type of failure;
  including the procedure to address the type of failure in the maintenance ticket; and
  transmitting the maintenance ticket to a work management system.

9. A tangible processor-readable medium storing code representing instructions to cause a processor to perform operations, the operations comprising:
  receiving a plurality of alarm messages, each alarm message from the plurality of alarm messages being associated with a failure from a plurality of failures, each failure from the plurality of failures being associated with a service feature available within a telecommunication network between an endpoint and a server providing the service feature;
  determining, from the plurality of alarm messages, a failure rate for a type of failure having a common set of service feature failure characteristics; and
  generating automatically a maintenance ticket when the failure rate exceeds a threshold.

10. The tangible processor-readable medium of claim 9, wherein the telecommunication network comprises a voice over internet protocol network.

11. The tangible processor-readable medium of claim 9, wherein the set of service feature failure characteristics includes a failure mechanism.

12. The tangible processor-readable medium of claim 9, wherein the failure rate is a number of service feature failures associated with the set of service feature characteristics over a predetermined time period.

13. The tangible processor-readable medium of claim 9, wherein the service feature includes a locate me feature.

14. The tangible processor-readable medium of claim 9, further comprising automatically and selectively transmitting the maintenance ticket to a targeted recipient.

15. The tangible processor-readable medium of claim 9, further comprising:
  assigning a priority setting associated with the type of failure; and
  transmitting the maintenance ticket to a work management system.

16. The tangible processor-readable medium of claim 9, further comprising:
  determining automatically using a rules-based algorithm a procedure to address the type of failure;
  including the procedure to address the type of failure in the maintenance ticket; and
  transmitting the maintenance ticket to a work management system.

17. An apparatus, comprising:
  a processor; and
  a memory device in communication with the processor, wherein the memory device has stored thereon a plurality of instructions, the plurality of instructions including instructions which, when executed by the processor, cause the processor to perform operations, the operations comprising:
    receiving a plurality of alarm messages, each alarm message from the plurality of alarm messages being associated with a failure from a plurality of failures, each failure from the plurality of failures being associated with a service feature available within a telecommunication network between an endpoint and a server providing the service feature;
determining, from the plurality of alarm messages, a failure rate for a type of failure having a common set of service feature failure characteristics; and
generating automatically a maintenance ticket when the failure rate exceeds a threshold.

18. The apparatus of claim 17, wherein the set of service feature failure characteristics includes a failure mechanism.

19. The apparatus of claim 17, wherein the failure rate is a number of service feature failures associated with the set of service feature characteristics over a predetermined time period.

20. The apparatus of claim 17, wherein the service feature includes a locate me feature.

* * * * *